United States Patent
Shadid et al.

(10) Patent No.: US 11,195,157 B2
(45) Date of Patent: Dec. 7, 2021

(54) SYSTEM FOR AND METHOD OF AUTOMATED TIPPING DURING COMMERCIAL TRANSACTIONS

(71) Applicant: JPMorgan Chase Bank, N.A., New York, NY (US)

(72) Inventors: Noor Shadid, Wilmington, DE (US); Eric Han Kai Chang, Wilmington, DE (US); Mark Wagner, Wilmington, DE (US); James P. White, III, Middletown, DE (US); Julia Elyasheva, Woodmere, NY (US)

(73) Assignee: JPMORGAN CHASE BANK, N.A., New York, NY (US)

( * ) Notice: Subject to any disclaimer, the term of this patent is extended or adjusted under 35 U.S.C. 154(b) by 328 days.

(21) Appl. No.: 16/289,062

(22) Filed: Feb. 28, 2019

(65) Prior Publication Data
US 2019/0279177 A1     Sep. 12, 2019

Related U.S. Application Data

(60) Provisional application No. 62/640,343, filed on Mar. 8, 2018.

(51) Int. Cl.
| G06Q 40/00 | (2012.01) |
| G06Q 20/14 | (2012.01) |
| G06Q 20/40 | (2012.01) |
| G06Q 20/20 | (2012.01) |
| G06Q 30/06 | (2012.01) |

(52) U.S. Cl.
CPC .......... *G06Q 20/14* (2013.01); *G06Q 20/206* (2013.01); *G06Q 20/40* (2013.01); *G06Q 30/06* (2013.01)

(58) Field of Classification Search
None
See application file for complete search history.

(56) References Cited

U.S. PATENT DOCUMENTS

| 2010/0325048 A1* | 12/2010 | Carlson .................. G06Q 20/20 705/44 |
| 2014/0040147 A1* | 2/2014 | Varadarajan ....... G06Q 20/3823 705/71 |
| 2014/0067828 A1* | 3/2014 | Archibong ....... H04N 21/26258 707/748 |
| 2014/0279539 A1* | 9/2014 | Rephlo ................ G06Q 20/405 705/44 |
| 2014/0282934 A1* | 9/2014 | Miasnik .................. G06F 16/95 726/5 |
| 2018/0005203 A1* | 1/2018 | Grassadonia ........ G06Q 20/102 |

FOREIGN PATENT DOCUMENTS

| WO | WO 2015/039254 | * | 3/2015 | ............ G06Q 30/02 |

* cited by examiner

*Primary Examiner* — Olabode Akintola
(74) *Attorney, Agent, or Firm* — Greenblum & Bernstein, P.L.C.

(57) ABSTRACT

Systems and methods for efficiently conducting a commercial transaction involving a gratuity are provided. The systems and methods enable users to set tipping preferences in advance so as to be applied automatically during subsequent commercial transactions.

14 Claims, 8 Drawing Sheets

SYSTEM FOR AND METHOD OF AUTOMATED TIPPING DURING COMMERCIAL TRANSACTIONS

CROSS-REFERENCE TO RELATED APPLICATIONS

This application claims the benefit of U.S. Provisional Patent Application Ser. No. 62/640,343, filed Mar. 8, 2018, which is hereby incorporated by reference in its entirety.

BACKGROUND

1. Field of the Disclosure

This technology generally relates to commercial transactions and, more particularly, to systems for and methods of more efficiently conducting a commercial transaction when a gratuity is involved.

2. Background Information

In some commercial transactions, a gratuity (also known as a tip) is a sum that is voluntarily (but customarily) provided in recognition of a rendered service. The gratuity is in addition to the actual cost of the purchased goods and/or service. Examples of businesses, where tipping is common, include restaurants, bars, coffee shops, taxis, and hair salons.

A conventional method 100 of processing a commercial transaction involving a gratuity, such as settling the bill after a meal in a restaurant, is shown in FIG. 1. According to the conventional method 100, payment for the meal is initially provided in step S102. This payment is directed to a first sum due for the meal itself, including any taxes and other required (i.e., non-optional) fees. Accordingly, an initial (usually itemized) receipt is provided to the customer that shows the first sum, prior to any payment method being chosen. Payment can be made in any manner accepted by the merchant, with a credit card being a commonly used form of payment.

In step S104, the credit card is charged (or at least preauthorized) for the first sum to generate an intermediate receipt. The intermediate receipt includes a place for the customer to write in or otherwise indicate a second sum representing the gratuity for the table service associated with the meal. In some cases, the customer will calculate the second sum as a percentage (e.g., 20%) of the first sum.

In step S106, after any tip is indicated on the intermediate receipt, the customer signs the intermediate receipt to create a final receipt that reflects the adjusted total being paid (i.e., the combination of the first sum and the second sum). In some instances, the merchant provides two copies of the intermediate receipt so that each may be transformed into a final receipt, with one copy being provided for the customer and the other copy being provided for the merchant.

Typically, at some later time, in step S108, the first sum and the second sum are reconciled (i.e., associated as belonging to the same transaction) by the credit card processing entity. Consequently, only the single reconciled charge will appear on the customer's statement.

In the above example, the commercial transaction may take a longer time than desired, as the customer is made to wait for the intermediate receipt, manually calculate a tip based on the amount of the meal, and manually write the tip amount on the intermediate receipt in order to create the final receipt. This may result in the customer having to remain in the restaurant for many minutes after the meal is completed, which may be frustrating.

In view of the above, there is an unmet need for systems for and methods of efficiently completing a commercial transaction involving a gratuity, particularly when a credit card payment is being made.

SUMMARY

The present disclosure, through one or more of its various aspects, embodiments, and/or specific features or sub-components, provides, inter alia, various systems, servers, devices, methods, media, programs, and platforms for conducting a commercial transaction that includes a gratuity. The various aspects, embodiments, features, and/or sub-components provide optimized processes of conducting a commercial transaction that includes a gratuity based on user preferences that are obtainable from a web application during execution thereof.

According to an aspect of the present disclosure, a method for conducting a commercial transaction that includes a gratuity is provided. The method is implemented by a web application that is executed by a processor. The method includes: receiving, by the processor via the web application and from a user, user input that includes at least one gratuity entry and at least one merchant entry that corresponds to the at least one gratuity entry; receiving, by the processor via the web application and from a merchant that corresponds to the at least one merchant entry, first information that relates to the commercial transaction, the first information including a pre-gratuity amount; calculating, by the processor, a total amount by using the at least one gratuity entry and the received first information; displaying, by the processor via the web application on a display screen, second information that relates to the commercial transaction, the second information including the calculated total amount; receiving, by the processor via the web application from the user, an authorization to proceed with the commercial transaction; and submitting, by the processor via the web application to a payment provider, the calculated total amount and the received authorization to proceed, in order to execute the commercial transaction.

The at least one gratuity entry may represent a numerical percentage.

The at least one merchant entry may include a merchant type.

The at least one merchant entry may include a merchant name.

The at least one gratuity entry may represent an amount of currency.

The submitting may include charging a credit card account associated with the user.

The method may further include authenticating, by the processor via the web application and prior to the receiving the authorization to proceed, the user by using at least one from among a password, a facial recognition, and a fingerprint input.

The method may further include receiving, by the processor via the web application from the user, an additional entry that relates to at least one rule for determining an amount of the gratuity. The at least one rule may include at least one from among a merchant-specific rule that corresponds to a specific merchant and a location rule that corresponds to a geographical location of the commercial transaction. The calculating may include adjusting the calculated total amount by applying each of the at least one rule thereto.

The receiving the user input may include displaying, by the processor via the web application on the display screen, a user interface that includes a list of predetermined percentages, and receiving, from the user via the display screen, a touch input that corresponds to one percentage from among the listed percentages.

The receiving the user input may include displaying, by the processor via the web application on the display screen, a user interface that includes a blank space for entering textual information, and receiving, from the user, a textual input that corresponds to at least one from among the at least one gratuity entry and the at least one merchant entry.

According to another aspect of the present disclosure, a portable device configured to implement an execution of a web application for conducting a commercial transaction that includes a gratuity is provided. The portable device includes a display screen, a processor, and a communication interface coupled to each of the processor and the display screen. When the web application is being executed, the processor is configured to: wherein, when the web application is being executed, the processor is configured to: receive, from a user via the communication interface, user input that includes at least one gratuity entry and at least one merchant entry that corresponds to the at least one gratuity entry; receive, from a merchant that corresponds to the at least one merchant entry via the communication interface, first information that relates to the commercial transaction, the first information including a pre-gratuity amount; calculate a total amount by using the at least one gratuity entry and the received first information; display, on the display screen, second information that relates to the commercial transaction, the second information including the calculated total amount; receive, from the user via the communication interface, an authorization to proceed with the commercial transaction; and submit, to a payment provider via the communication interface, the calculated total amount and the received authorization to proceed, in order to execute the commercial transaction.

The at least one gratuity entry may represent a numerical percentage.

The at least one merchant entry may include a merchant type.

The at least one merchant entry may include a merchant name.

The at least one gratuity entry may include an amount of currency.

The processor may be further configured to perform the submitting by charging a credit card account associated with the user.

The processor may be further configured to authenticate the user prior to the receiving the authorization to proceed by using at least one from among a password, a facial recognition, and a fingerprint input.

The processor may be further configured to receive, from the user via the communication interface, an additional entry that relates to at least one rule for determining an amount of the gratuity. The at least one rule may include at least one from among a merchant-specific rule that corresponds to a specific merchant and a location rule that corresponds to a geographical location of the commercial transaction. The processor may be further configured to adjust the calculated total amount by applying each of the at least one rule thereto.

The processor may be further configured to receive the user input by displaying, on the display screen, a user interface that includes a list of predetermined percentages, and receiving, from the user via the display screen, a touch input that corresponds to one percentage from among the listed percentages.

The processor may be further configured to receive the user input by displaying, on the display screen, a user interface that includes a blank space for entering textual information, and receiving, from the user, a textual input that corresponds to at least one from among the gratuity entry and the merchant entry.

BRIEF DESCRIPTION OF THE DRAWINGS

The present disclosure is further described in the detailed description which follows, in reference to the noted plurality of drawings, by way of non-limiting examples of preferred embodiments of the present disclosure, in which like characters represent like elements throughout the several views of the drawings.

DETAILED DESCRIPTION

Through one or more of its various aspects, embodiments and/or specific features or sub-components of the present disclosure, are intended to bring out one or more of the advantages as specifically described above and noted below.

The examples may also be embodied as one or more non-transitory computer readable media having instructions stored thereon for one or more aspects of the present technology as described and illustrated by way of the examples herein. The instructions in some examples include executable code that, when executed by one or more processors, cause the processors to carry out steps necessary to implement the methods of the examples of this technology that are described and illustrated herein.

Figure 1:
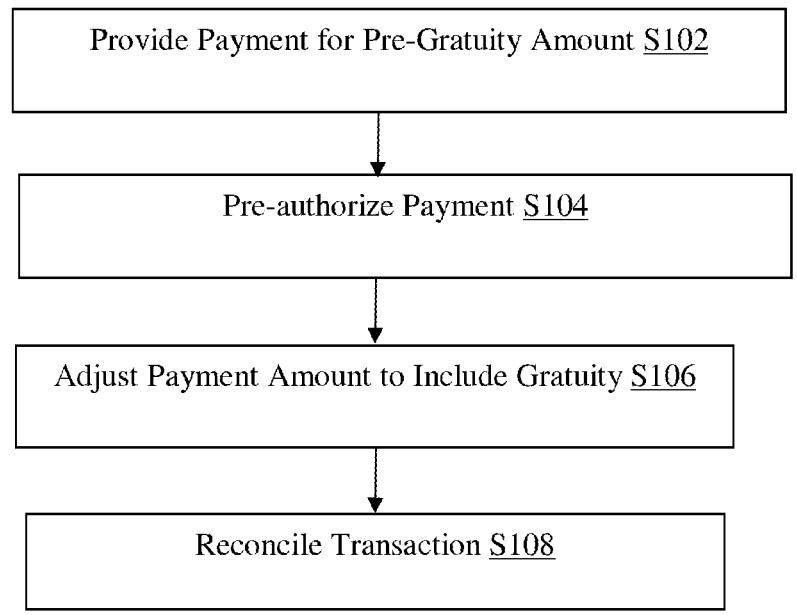
FIG. 1 is a flowchart of a process of a conventional commercial transaction involving a gratuity.
Figure 2:
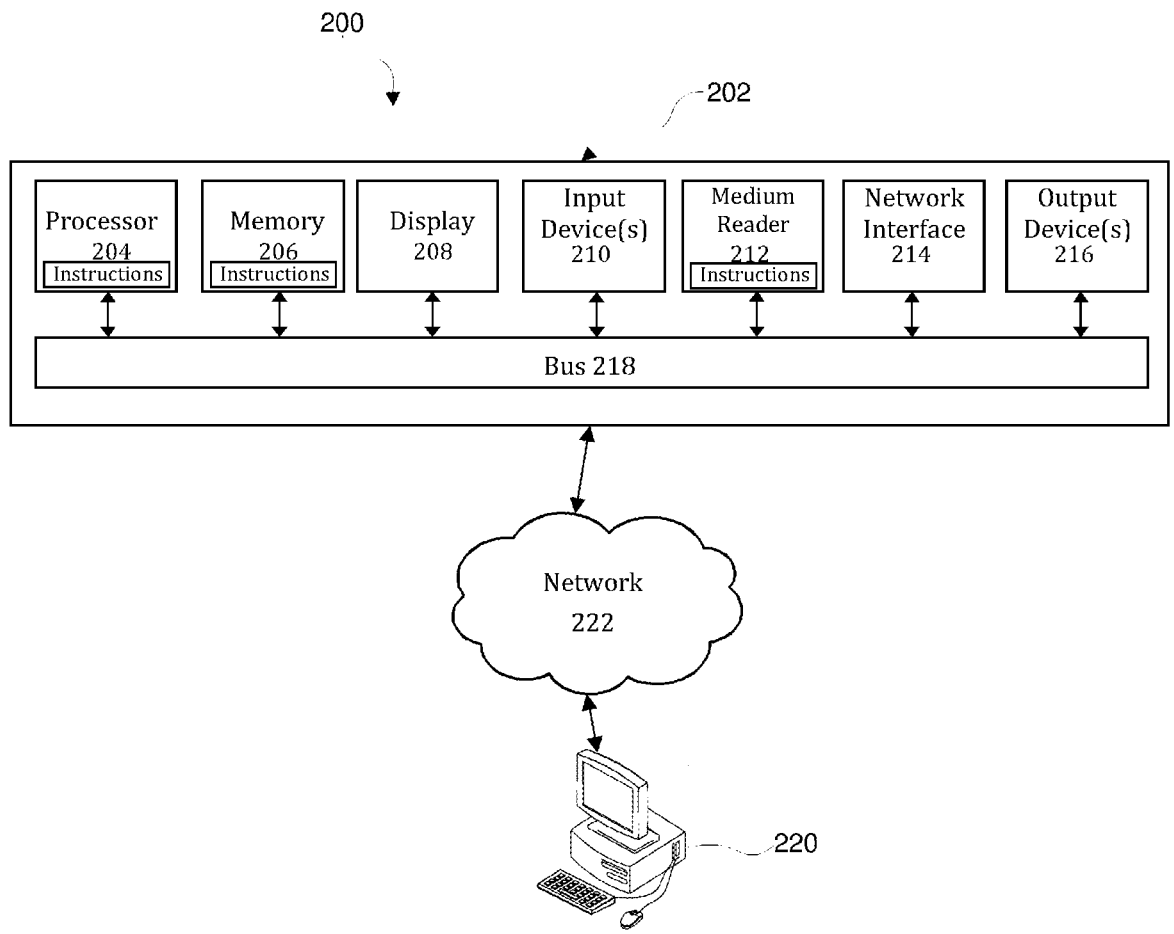
FIG. 2 illustrates an exemplary computer system for conducting a commercial transaction that includes a gratuity via an execution of a web application.

FIG. 2 is an exemplary system for use in accordance with the embodiments described herein. The system 200 is generally shown and may include a computer system 202, which is generally indicated.

The computer system 202 may include a set of instructions that can be executed to cause the computer system 202 to perform any one or more of the methods or computer based functions disclosed herein, either alone or in combination with the other described devices. The computer system 202 may operate as a standalone device or may be connected to other systems or peripheral devices. For example, the computer system 202 may include, or be included within, any one or more computers, servers, systems, communication networks or cloud environment. Even further, the instructions may be operative in such cloud-based computing environment.

In a networked deployment, the computer system 202 may operate in the capacity of a server or as a client user computer in a server-client user network environment, a client user computer in a cloud computing environment, or as a peer computer system in a peer-to-peer (or distributed) network environment. The computer system 202, or portions thereof, may be implemented as, or incorporated into, various devices, such as a personal computer, a tablet computer, a set-top box, a personal digital assistant, a mobile device, a palmtop computer, a laptop computer, a desktop computer, a communications device, a wireless smart phone, a personal trusted device, a wearable device, a global positioning satellite (GPS) device, a web appliance, or any other machine capable of executing a set of instructions (sequential or otherwise) that specify actions to be taken by that machine. Further, while a single computer system 202 is illustrated, additional embodiments may include any collection of systems or sub-systems that individually or jointly execute instructions or perform functions. The term "system" shall be taken throughout the present disclosure to include any collection of systems or sub-systems that individually or jointly execute a set, or multiple sets, of instructions to perform one or more computer functions.

As illustrated in FIG. 2, the computer system 202 may include at least one processor 204. The processor 204 is tangible and non-transitory. As used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The processor 204 is an article of manufacture and/or a machine component. The processor 204 is configured to execute software instructions in order to perform functions as described in the various embodiments herein. The processor 204 may be a general purpose processor or may be part of an application specific integrated circuit (ASIC). The processor 204 may also be a microprocessor, a microcomputer, a processor chip, a controller, a microcontroller, a digital signal processor (DSP), a state machine, or a programmable logic device. The processor 204 may also be a logical circuit, including a programmable gate array (PGA) such as a field programmable gate array (FPGA), or another type of circuit that includes discrete gate and/or transistor logic. The processor 204 may be a central processing unit (CPU), a graphics processing unit (GPU), or both. Additionally, any processor described herein may include multiple processors, parallel processors, or both. Multiple processors may be included in, or coupled to, a single device or multiple devices.

The computer system 202 may also include a computer memory 206. The computer memory 206 may include a static memory, a dynamic memory, or both in communication. Memories described herein are tangible storage mediums that can store data and executable instructions, and are non-transitory during the time instructions are stored therein. Again, as used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The memories are an article of manufacture and/or machine component. Memories described herein are computer-readable mediums from which data and executable instructions can be read by a computer. Memories as described herein may be random access memory (RAM), read only memory (ROM), flash memory, electrically programmable read only memory (EPROM), electrically erasable programmable read-only memory (EEPROM), registers, a hard disk, a cache, a removable disk, tape, compact disk read only memory (CD-ROM), digital versatile disk (DVD), floppy disk, blu-ray disk, or any other form of storage medium known in the art. Memories may be volatile or non-volatile, secure and/or encrypted, unsecure and/or unencrypted. Of course, the computer memory 206 may comprise any combination of memories or a single storage.

The computer system 202 may further include a video display 208, such as a liquid crystal display (LCD), an organic light emitting diode (OLED), a flat panel display, a solid state display, a cathode ray tube (CRT), a plasma display, or any other known display.

The computer system 202 may also include at least one input device 210, such as a keyboard, a touch-sensitive input screen or pad, a speech input, a mouse, a remote control device having a wireless keypad, a microphone coupled to a speech recognition engine, a camera such as a video camera or still camera, a cursor control device, a global positioning system (GPS) device, an altimeter, a gyroscope, an accelerometer, a proximity sensor, or any combination thereof. Those skilled in the art appreciate that various embodiments of the computer system 202 may include multiple input devices 210. Moreover, those skilled in the art further appreciate that the above-listed, exemplary input devices 210 are not meant to be exhaustive and that the computer system 202 may include any additional, or alternative, input devices 210.

The computer system 202 may also include a medium reader 212 which is configured to read any one or more sets of instructions, e.g. software, from any of the memories described herein. The instructions, when executed by a processor, can be used to perform one or more of the methods and processes as described herein. In a particular embodiment, the instructions may reside completely, or at least partially, within the memory 206, the medium reader 212, and/or the processor 210 during execution by the computer system 202.

Furthermore, the computer system 202 may include any additional devices, components, parts, peripherals, hardware, software or any combination thereof which are commonly known and understood as being included with or within a computer system, such as, but not limited to, a network interface 214 and an output device 216. The output device 216 may be, but is not limited to, a speaker, an audio out, a video out, a remote control output, a printer, or any combination thereof.

Each of the components of the computer system 202 may be interconnected and communicate via a bus 218 or other communication link. As shown in FIG. 2, the components may each be interconnected and communicate via an internal bus. However, those skilled in the art appreciate that any of the components may also be connected via an expansion bus. Moreover, the bus 218 may enable communication via any standard or other specification commonly known and understood such as, but not limited to, peripheral component interconnect, peripheral component interconnect express, parallel advanced technology attachment, serial advanced technology attachment, etc.

The computer system 202 may be in communication with one or more additional computer devices 220 via a network 222. The network 222 may be, but is not limited to, a local area network, a wide area network, the Internet, a telephony network, a short-range network, or any other network commonly known and understood in the art. The short-range network may include, for example, Bluetooth, Zigbee, infrared, near field communication, ultraband, or any combination thereof. Those skilled in the art appreciate that additional networks 222 which are known and understood may additionally or alternatively be used and that the exemplary networks 222 are not limiting or exhaustive. Also, while the network 222 is shown in FIG. 2 as a wireless network, those skilled in the art appreciate that the network 222 may also be a wired network.

The additional computer device 220 is shown in FIG. 2 as a personal computer. However, those skilled in the art appreciate that, in alternative embodiments of the present application, the computer device 220 may be a laptop computer, a tablet PC, a personal digital assistant, a mobile device, a palmtop computer, a desktop computer, a communications device, a wireless telephone, a personal trusted device, a web appliance, a server, or any other device that is capable of executing a set of instructions, sequential or otherwise, that specify actions to be taken by that device. Of course, those skilled in the art appreciate that the above-listed devices are merely exemplary devices and that the device 220 may be any additional device or apparatus commonly known and understood in the art without departing from the scope of the present application. For example, the computer device 220 may be the same or similar to the computer system 202. Furthermore, those skilled in the art similarly understand that the device may be any combination of devices and apparatuses.

Of course, those skilled in the art appreciate that the above-listed components of the computer system 202 are merely meant to be exemplary and are not intended to be exhaustive and/or inclusive. Furthermore, the examples of the components listed above are also meant to be exemplary and similarly are not meant to be exhaustive and/or inclusive.

In accordance with various embodiments of the present disclosure, the methods described herein may be implemented using a hardware computer system that executes software programs. Further, in an exemplary, non-limited embodiment, implementations can include distributed processing, component/object distributed processing, and parallel processing. Virtual computer system processing can be constructed to implement one or more of the methods or functionality as described herein, and a processor described herein may be used to support a virtual processing environment.

As described herein, various embodiments provide optimized processes of using a web application to conduct a commercial transaction that involves a gratuity.

Figure 3:
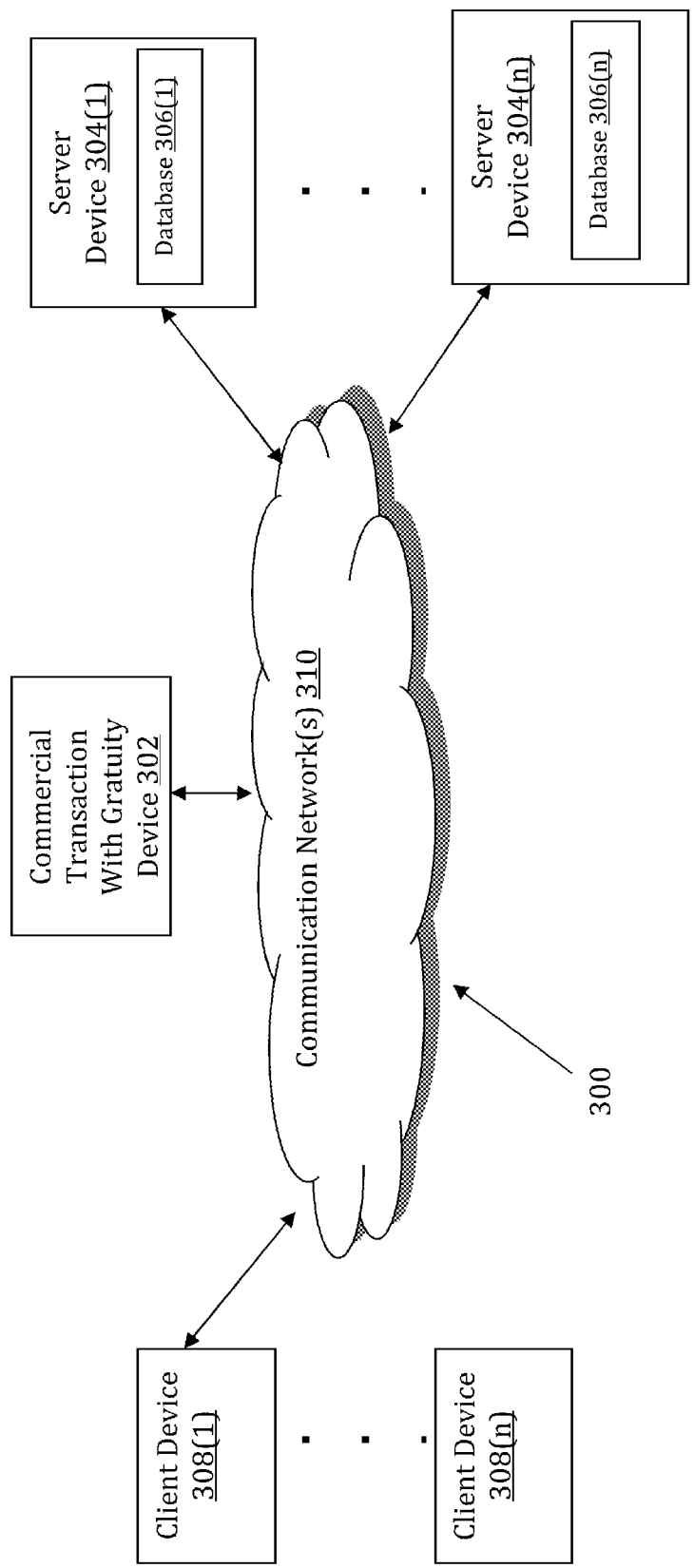
FIG. 3 illustrates an exemplary diagram of a network environment.

Referring to FIG. 3, a schematic of an exemplary network environment 300 for implementing a method for conducting a commercial transaction that involves a gratuity is illustrated. In an exemplary embodiment, the method is implemented in a web application that is executable on any networked computer platform, such as, for example, a wireless mobile communication device, i.e., a smart phone.

The conducting of the commercial transaction involving a gratuity may be implemented by a Commercial Transaction With Gratuity (CTWG) device 302. The CTWG device 302 may be the same or similar to the computer system 202 as described with respect to FIG. 2. The CTWG device 302 may store one or more applications that can include executable instructions that, when executed by the CTWG device 302, cause the CTWG device 302 to perform actions, such as to transmit, receive, or otherwise process network messages, for example, and to perform other actions' described and illustrated below with reference to the figures. The application(s) may be implemented as modules or components of other applications. Further, the application(s) can be implemented as operating system extensions, modules, plugins, or the like.

Even further, the application(s) may be operative in a cloud-based computing environment. The application(s) may be executed within or as virtual machine(s) or virtual server(s) that may be managed in a cloud-based computing environment. Also, the application(s), and even the CTWG device 302 itself, may be located in virtual server(s) running in a cloud-based computing environment rather than being tied to one or more specific physical network computing devices. Also, the application(s) may be running in one or more virtual machines (VMs) executing on the CTWG device 302. Additionally, in one or more embodiments of this technology, virtual machine(s) running on the CTWG device 302 may be managed or supervised by a hypervisor.

In the network environment 300 of FIG. 3, the CTWG device 302 is coupled to a plurality of server devices 304(1)-304($n$) that hosts a plurality of databases 306(1)-306($n$), and also to a plurality of client devices 308(1)-308($n$) via communication network(s) 310. A communication interface of the CTWG device 302, such as the network interface 214 of the computer system 202 of FIG. 2, operatively couples and communicates between the CTWG device 302, the server devices 304(1)-304($n$), and/or the client devices 308(1)-308($n$), which are all coupled together by the communication network(s) 310, although other types and/or numbers of communication networks or systems with other types and/or numbers of connections and/or configurations to other devices and/or elements may also be used.

The communication network(s) 310 may be the same or similar to the network 222 as described with respect to FIG. 2, although the CTWG device 302, the server devices 304(1)-304($n$), and/or the client devices 308(1)-308($n$) may be coupled together via other topologies. Additionally, the network environment 300 may include other network devices such as one or more routers and/or switches, for example, which are well known in the art and thus will not be described herein. This technology provides a number of advantages including methods, non-transitory computer readable media, and CTWG devices that efficiently conduct commercial transactions involving gratuities.

By way of example only, the communication network(s) 310 may include local area network(s) (LAN(s)) or wide area network(s) (WAN(s)), and can use TCP/IP over Ethernet and industry-standard protocols, although other types and/or numbers of protocols and/or communication networks may be used. The communication network(s) 310 in this example may employ any suitable interface mechanisms and network communication technologies including, for example, teletraffic in any suitable form (e.g., voice, modem, and the like), Public Switched Telephone Network (PSTNs), Ethernet-based Packet Data Networks (PDNs), combinations thereof, and the like.

The CTWG device 302 may be a standalone device or integrated with one or more other devices or apparatuses, such as one or more of the server devices 304(1)-304(n), for example. In one particular example, the CTWG device 302 may include or be hosted by one of the server devices 304(1)-304(n), and other arrangements are also possible. Moreover, one or more of the devices of the CTWG device 302 may be in a same or a different communication network including one or more public, private, or cloud networks, for example.

The plurality of server devices 304(1)-304(n) may be the same or similar to the computer system 202 or the computer device 220 as described with respect to FIG. 2, including any features or combination of features described with respect thereto. For example, any of the server devices 304(1)-304(n) may include, among other features, one or more processors, a memory, and a communication interface, which are coupled together by a bus or other communication link, although other numbers and/or types of network devices may be used. The server devices 304(1)-304(n) in this example may process requests received from the CTWG device 302 via the communication network(s) 310 according to the HTTP-based and/or JavaScript Object Notation (JSON) protocol, for example, although other protocols may also be used.

The server devices 304(1)-304(n) may be hardware or software or may represent a system with multiple servers in a pool, which may include internal or external networks. The server devices 304(1)-304(n) hosts the databases 306(1)-306(n) that are configured to store gratuity data, merchant data, and rules that relate to the web application.

Although the server devices 304(1)-304(n) are illustrated as single devices, one or more actions of each of the server devices 304(1)-304(n) may be distributed across one or more distinct network computing devices that together comprise one or more of the server devices 304(1)-304(n). Moreover, the server devices 304(1)-304(n) are not limited to a particular configuration. Thus, the server devices 304(1)-304(n) may contain a plurality of network computing devices that operate using a master/slave approach, whereby one of the network computing devices of the server devices 304(1)-304(n) operates to manage and/or otherwise coordinate operations of the other network computing devices.

The server devices 304(1)-304(n) may operate as a plurality of network computing devices within a cluster architecture, a peer-to peer architecture, virtual machines, or within a cloud architecture, for example. Thus, the technology disclosed herein is not to be construed as being limited to a single environment and other configurations and architectures are also envisaged.

The plurality of client devices 308(1)-308(n) may also be the same or similar to the computer system 202 or the computer device 220 as described with respect to FIG. 2, including any features or combination of features described with respect thereto. For example, the client devices 308(1)-308(n) in this example may include any type of computing device that can facilitate the execution of a web application. Accordingly, the client devices 308(1)-308(n) may be mobile computing devices, desktop computing devices, laptop computing devices, tablet computing devices, virtual machines (including cloud-based computers), or the like, that host chat, e-mail, or voice-to-text applications, for example. In an exemplary embodiment, at least one client device 308 is a wireless mobile communication device, i.e., a smart phone.

The client devices 308(1)-308(n) may run interface applications, such as standard web browsers or standalone client applications, which may provide an interface to communicate with the CTWG device 302 via the communication network(s) 310 in order to communicate user requests. The client devices 308(1)-308(n) may further include, among other features, a display device, such as a display screen or touchscreen, and/or an input device, such as a keyboard, for example.

Although the exemplary network environment 300 with the CTWG device 302, the server devices 304(1)-304(n), the client devices 308(1)-308(n), and the communication network(s) 310 are described and illustrated herein, other types and/or numbers of systems, devices, components, and/or elements in other topologies may be used. It is to be understood that the systems of the examples described herein are for exemplary purposes, as many variations of the specific hardware and software used to implement the examples are possible, as will be appreciated by those skilled in the relevant art(s).

One or more of the devices depicted in the network environment 300, such as the CTWG device 302, the server devices 304(1)-304(n), or the client devices 308(1)-308(n), for example, may be configured to operate as virtual instances on the same physical machine. In other words, one or more of the CTWG device 302, the server devices 304(1)-304(n), or the client devices 308(1)-308(n) may operate on the same physical device rather than as separate devices communicating through communication network(s) 310. Additionally, there may be more or fewer CTWG devices 302, server devices 304(1)-304(n), or client devices 308(1)-308(n) than illustrated in FIG. 3.

In addition, two or more computing systems or devices may be substituted for any one of the systems or devices in any example. Accordingly, principles and advantages of distributed processing, such as redundancy and replication also may be implemented, as desired, to increase the robustness and performance of the devices and systems of the examples. The examples may also be implemented on computer system(s) that extend across any suitable network using any suitable interface mechanisms and traffic technologies, including by way of example only teletraffic in any suitable form (e.g., voice and modem), wireless traffic networks, cellular traffic networks, Packet Data Networks (PDNs), the Internet, intranets, and combinations thereof.

Figure 4:
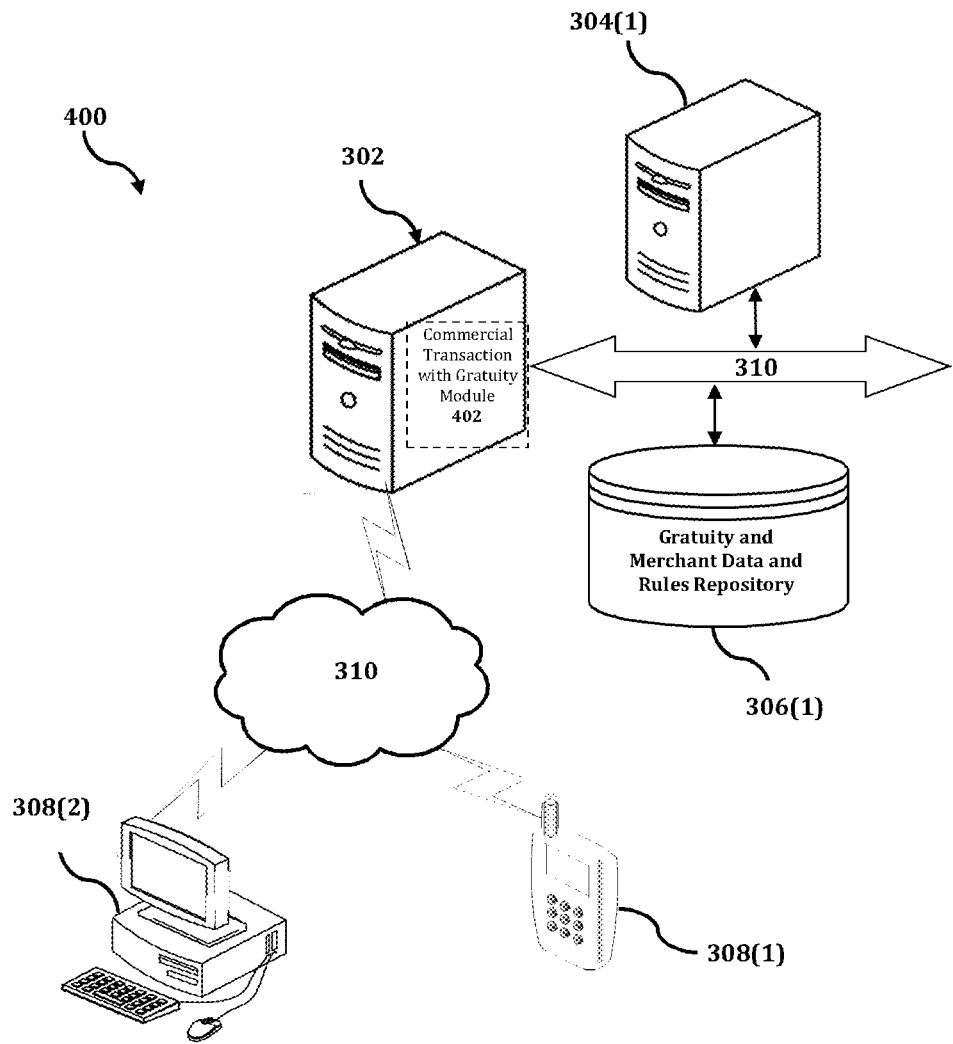
FIG. 4 shows an exemplary system for conducting a commercial transaction that includes a gratuity via an execution of a web application.

The CTWG device 302 is described and shown in FIG. 4 as including a commercial transaction with gratuity module 402, although it may include other rules, policies, modules, databases, or applications, for example. As will be described below, the commercial transaction with gratuity module 402 is configured to conduct a commercial transaction involving a gratuity in an automated, efficient, scalable, and reliable manner. Based on information obtained via the web application, the commercial transaction with gratuity module 402 receives information that relates to a proposed commercial transaction, automatically determines an amount of a gratuity, and then processes the commercial transaction.

An exemplary process 400 for conducting a commercial transaction involving a gratuity by utilizing the network environment of FIG. 3 is shown as being executed in FIG. 4. Specifically, a first client device 308(1) and a second client device 308(2) are illustrated as being in communication with CTWG device 302. In this regard, the first client device 308(1) and the second client device 308(2) may be "clients" of the CTWG device 302 and are described herein as such. Nevertheless, it is to be known and understood that the first client device 308(1) and/or the second client device 308(2) need not necessarily be "clients" of the CTWG device 302, or any entity described in association therewith herein. Any additional or alternative relationship may exist between either or both of the first client device 308(1) and the second client device 308(2) and the CTWG device 302, or no relationship may exist.

Further, CTWG device 302 is illustrated as being able to access a gratuity and merchant data and rules repository 306(1). The commercial transaction with gratuity module 402 may be configured to access this database for implementing a process for conducting a commercial transaction that involves a gratuity.

The first client device 308(1) may be, for example, a smart phone. Of course, the first client device 308(1) may be any additional device described herein. The second client device 308(2) may be, for example, a personal computer (PC). Of course, the second client device 308(2) may also be any additional device described herein.

The process may be executed via the communication network(s) 310, which may comprise plural networks as described above. For example, in an exemplary embodiment, either or both of the first client device 308(1) and the second client device 308(2) may communicate with the CTWG device 302 via broadband or cellular communication. Of course, these embodiments are merely exemplary and are not limiting or exhaustive.

Upon being started, the commercial transaction with gratuity module 402 executes a process for conducting a commercial transaction involving a gratuity. An exemplary process for using a smart phone on which a web application to conduct a commercial transaction that involves a gratuity has been downloaded is generally indicated at flowchart 500 in FIG. 5.

Figure 5:
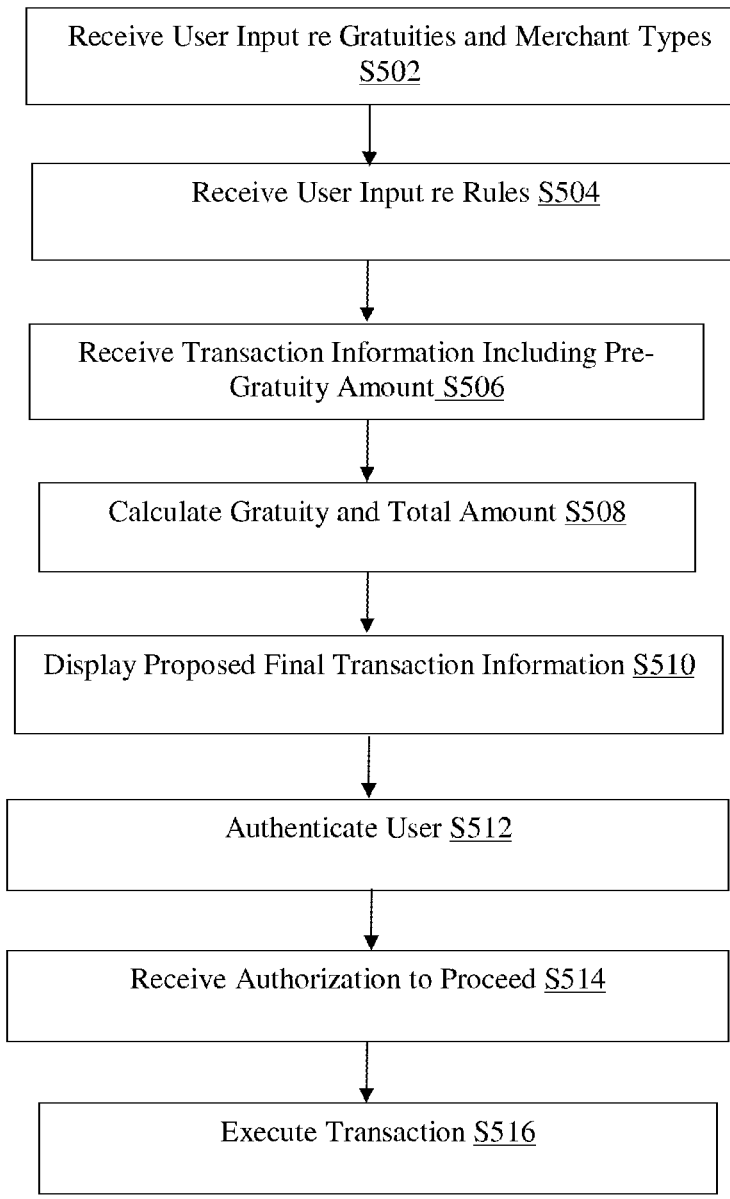
FIG. 5 is a flowchart of an exemplary process for conducting a commercial transaction that includes a gratuity via an execution of a web application.

In the process 500 of FIG. 5, while executing the web application, at step S502, a user provides inputs that indicate predetermined gratuity amounts for respective types of merchants. The merchant types may include any type of commercial establishment at which the user may expect to make purchases that involve a gratuity, such as, for example, restaurants, bars, nightclubs, hair salons, manicure/pedicure salons, hotels, or any other suitable entity. In an exemplary embodiment, a particular predetermined gratuity amount may be expressed as a percentage, such as, for example, 5%, 10%, 12%, 15%, or 20%. In this aspect, the gratuity may be calculated by multiplying the amount of the charge for the goods or services by the applicable percentage. Alternatively, a particular predetermined gratuity amount may be expressed as a specific amount of currency, such as, for example, ten U.S. dollars ($10), five U.K. pounds sterling (£10), or three euros (€3).

At step S504, the user may enter one or more rules to be applied by the web application in determining an amount of a gratuity. In an exemplary embodiment, a rule may be a location rule that corresponds to a geographic location of the commercial transaction, or a merchant-specific rule that corresponds to a specific merchant. For example, the user may be aware that tipping is not customary in Japan, and so the user may enter a location rule that when the commercial transaction is being conducted in Japan, the amount of the gratuity is to be determined to be equal to zero (0). In this regard, the user may have previously set the predetermined gratuity for a restaurant to be 20%, but the rule would override the predetermined gratuity amount for a restaurant that is located in Japan. As another example, the user may have a favorite bar, and therefore may wish to pay a larger gratuity amount for that bar. Thus, for example, the user may set the predetermined gratuity amount for bars to be 15%, but for the specific bar that is the user's favorite, the user may enter a merchant-specific rule that sets the gratuity amount for that bar to be 33%.

At step S506, transaction information is provided to the web application. In an exemplary embodiment, the transaction information includes a pre-gratuity amount of the transaction, a merchant name, a merchant location, a payment mechanism, and any other information that relates to the transaction. For example, when a user enjoys a dinner with a companion at a Del Frisco's Double Eagle Steakhouse in New York, the cost of the dinners may be equal to $240, and therefore, the transaction information would include information that identifies the merchant type (i.e., a restaurant), the name of the restaurant (i.e., Del Frisco's), the location of the restaurant (i.e., New York), and the pre-gratuity amount of the transaction (i.e., $240). The payment mechanism may include, for example, a credit card name.

At step S508, an amount of a gratuity is calculated, and a total amount is calculated. In an exemplary embodiment, the web application uses the predetermined gratuity amounts, the merchant information, and the rules to calculate the amount of the gratuity. For example, if the user has previously set the predetermined gratuity amount for restaurants to be equal to 20%, and if there are no rules that specifically relate to the Del Frisco's restaurant in New York, then for a pre-gratuity bill amount of $240, the amount of the gratuity would be calculated as $240*0.20=$48, and the total amount would be calculated as $240+$48=$288.

At step S510, the proposed final transaction information is displayed on the user's smart phone. In an exemplary embodiment, the transaction information may include the merchant name, the pre-gratuity amount, the determined amount of the gratuity, and the total amount of the transaction. In addition, other information may be displayed, such as, for example, information that identifies the payment mechanism, such as a credit card name, a time and/or date of the transaction, and/or any other suitable information that relates to the proposed transaction. In an exemplary embodiment, the smart phone may display an area within which the user may adjust the amount of the gratuity by entering a different amount therefor, in which case the final amount is recalculated based on the adjusted gratuity amount.

At step S512, the user is authenticated. For example, the user may be prompted to provide an input, such as a password, an answer to a security question, or a fingerprint input, which may then be used by the web application to determine whether to authenticate the user as being a legitimate party for conducting the proposed transaction.

At step S514, an authorization to proceed with the proposed transaction is received. In an exemplary embodiment, the user has had an opportunity to review the relevant transaction information and has been authenticated, and the user is then prompted to provide a confirmation to proceed with the transaction. Then, at step S516, the web application executes the transaction.

Figure 6:
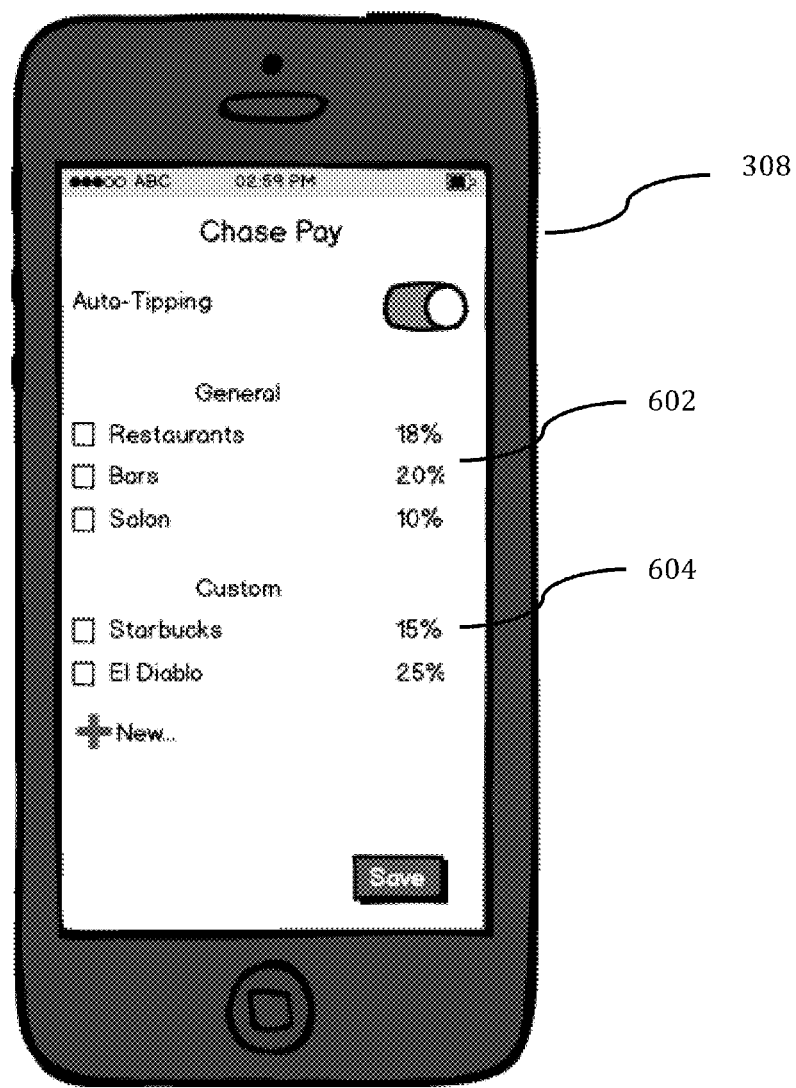
FIG. 6 illustrates a first exemplary screen shot of a display of a smart phone that is executing a web application for conducting a commercial transaction that includes a gratuity, according to an exemplary embodiment.
Figure 7:
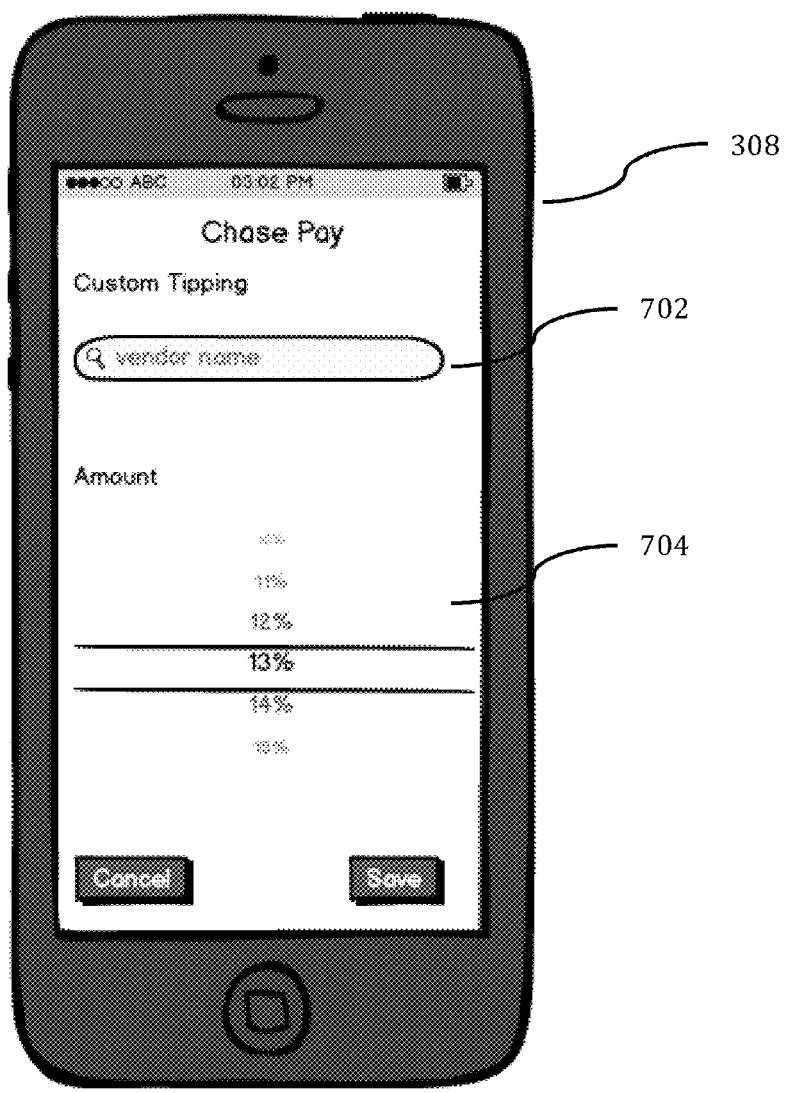
FIG. 7 illustrates a second exemplary screen shot of a display of a smart phone that is executing a web application for conducting a commercial transaction that includes a gratuity, according to an exemplary embodiment.
Figure 8:
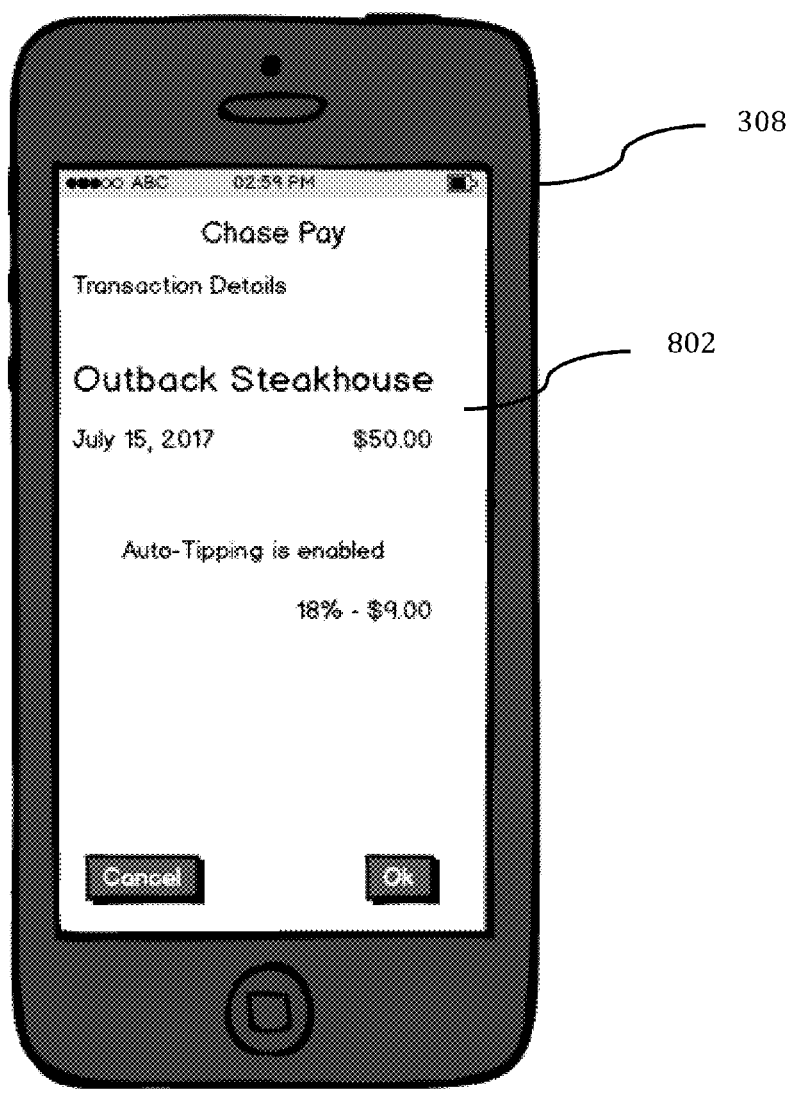
FIG. 8 illustrates a third exemplary screen shot of a display of a smart phone that is executing a web application for conducting a commercial transaction that includes a gratuity, according to an exemplary embodiment.

The systems and methods disclosed or suggested herein may include an application 600 or "app" running on a smart phone (e.g., smart phone 308). As shown in FIGS. 6, 7, and 8, according to an exemplary embodiment, the application 600 facilitates interaction by a user of the smart phone 308 and a merchant or service provider.

For example, referring to FIG. 6, in an exemplary embodiment, the application 600 provides a first user interface that enables a user to toggle auto-tipping "on" and "off"; enter and save gratuity amounts for different types of merchants at 602; and, if desired, enter and save customized gratuity amounts for specific merchants at 604.

Referring to FIG. 7, in an exemplary embodiment, the application 600 provides a second user interface that enables the user to enter a specific merchant (i.e., "vendor name") at 702, and to select a gratuity amount from a list of percentages 704 for the individual merchant.

Referring to FIG. 8, in an exemplary embodiment, the application 600 displays the relevant information 802 (i.e., "transaction details") for the proposed commercial transaction, together with a means for the user to either authorize/approve the transaction (i.e., "Ok") or cancel the transaction (i.e., "Cancel").

Accordingly, with this technology, an optimized process for conducting a commercial transaction involving a gratuity is provided. The optimized process enables a user to efficiently and automatically determine an amount of a gratuity and then complete the transaction.

Although the invention has been described with reference to several exemplary embodiments, it is understood that the words that have been used are words of description and illustration, rather than words of limitation. Changes may be made within the purview of the appended claims, as presently stated and as amended, without departing from the scope and spirit of the present disclosure in its aspects. Although the invention has been described with reference to particular means, materials and embodiments, the invention is not intended to be limited to the particulars disclosed; rather the invention extends to all functionally equivalent structures, methods, and uses such as are within the scope of the appended claims.

For example, while the computer-readable medium may be described as a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the embodiments disclosed herein.

The computer-readable medium may comprise a non-transitory computer-readable medium or media and/or comprise a transitory computer-readable medium or media. In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. Accordingly, the disclosure is considered to include any computer-readable medium or other equivalents and successor media, in which data or instructions may be stored.

Although the present application describes specific embodiments which may be implemented as computer programs or code segments in computer-readable media, it is to be understood that dedicated hardware implementations, such as application specific integrated circuits, programmable logic arrays and other hardware devices, can be constructed to implement one or more of the embodiments described herein. Applications that may include the various embodiments set forth herein may broadly include a variety of electronic and computer systems. Accordingly, the present application may encompass software, firmware, and hardware implementations, or combinations thereof. Nothing in the present application should be interpreted as being implemented or implementable solely with software and not hardware.

Although the present specification describes components and functions that may be implemented in particular embodiments with reference to particular standards and protocols, the disclosure is not limited to such standards and protocols. Such standards are periodically superseded by faster or more efficient equivalents having essentially the same functions. Accordingly, replacement standards and protocols having the same or similar functions are considered equivalents thereof.

The illustrations of the embodiments described herein are intended to provide a general understanding of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A method for conducting a commercial transaction that includes a gratuity, the method being implemented by a web application that is executed by a processor, the method comprising:
receiving, by the processor via the web application and from a user, user input that includes at least one gratuity entry and at least one merchant entry that corresponds to the at least one gratuity entry;
receiving, by the processor via the web application and from a merchant that corresponds to the merchant entry, first information that relates to the commercial transaction, the first information including a pre-gratuity amount;
calculating, by the processor, a total amount by using the at least one gratuity entry and the received first information;
displaying, by the processor via the web application on a display screen, second information that relates to the commercial transaction, the second information including the calculated total amount;
implementing a video camera to output facial information and fingerprint information of the user and authenticating, by the processor via the web application and prior to the receiving the authorization to proceed, the user based on a positive verification of the facial information and the fingerprint information of the user by comparing the facial information and fingerprint information of the user with pre-stored facial information and fingerprint information of the user;
receiving, by the processor via the web application from the user, an additional entry that relates to at least one rule for determining an amount of the gratuity, wherein the at least one rule includes at least one from among a merchant-specific rule that corresponds to a specific merchant and a location rule that corresponds to a geographical location data of the commercial transaction;
displaying, by the processor via the web application on the display screen, a user interface that includes a list of predetermined percentages;
wherein, when the additional entry includes the location rule, the method further comprising:
obtaining the geographical location data of the commercial transaction;
automatically overriding the list of predetermined percentages and automatically determining a new amount of the gratuity based on the geographical location data;
receiving, from the user via the display screen, a touch input that corresponds to the new amount of gratuity in response to the geographical location data;
receiving, by the processor via the web application from the user, an authorization to proceed with the commercial transaction with the new amount of gratuity; and
submitting, by the processor via the web application to a payment provider, the calculated total amount that includes the new amount of gratuity and the received authorization to proceed, in order to execute the commercial transaction, and
wherein, when the additional entry includes the merchant-specific rule, the method further comprising:
setting a predetermined gratuity amount for merchants belonging to a same class;
receiving information that a particular merchant among the merchants belonging to the same class is the user's favorite merchant;
applying, in response to receiving the information of said particular merchant, the merchant-specific rule that changes the predetermined gratuity amount for merchants belonging to the same class to a new gratuity amount that is more than the predetermined gratuity amount for merchants belonging to the same class;
receiving, from the user via the display screen, a touch input that corresponds to the new gratuity amount in response to applying the merchant-specific rule;
receiving, from the user via the communication interface, an authorization to proceed with the commercial transaction with the new gratuity amount; and
submitting to the payment provider via the communication interface, the calculated total amount that includes the new gratuity amount and the received authorization to proceed, in order to execute the commercial transaction.

2. The method of claim 1, wherein the at least one gratuity entry represents a numerical percentage.

3. The method of claim 1, wherein the at least one merchant entry includes a merchant type.

4. The method of claim 1, wherein the at least one merchant entry includes a merchant name.

5. The method of claim 1, wherein the at least one gratuity entry represents an amount of currency.

6. The method of claim 1, wherein the submitting comprises charging a credit card account associated with the user.

7. The method of claim 1, wherein the receiving the user input includes displaying, by the processor via the web application on the display screen, a user interface that includes a blank space for entering textual information, and receiving, from the user, a textual input that corresponds to at least one from among the at least one gratuity entry and the at least one merchant entry.

8. A portable device configured to implement an execution of a web application for conducting a commercial transaction that includes a gratuity, the portable device comprising:
a display screen;
a video camera;
a processor; and
a communication interface coupled to each of the processor, the video camera, and the display screen,
wherein, when the web application is being executed, the processor is configured to:
receive, from a user via the communication interface, user input that includes at least one gratuity entry and at least one merchant entry that corresponds to the at least one gratuity entry;
receive, from a merchant that corresponds to the at least one merchant entry via the communication interface, first information that relates to the commercial transaction, the first information including a pre-gratuity amount;
calculate a total amount by using the at least one gratuity entry and the received first information;
display, on the display screen, second information that relates to the commercial transaction, the second information including the calculated total amount;
implement the video camera to output facial information and fingerprint information of the user and authenticate, via the web application and prior to the receiving the authorization to proceed, the user based on a positive verification of the facial information and the fingerprint information of the user by comparing the facial information and fingerprint information of the user with pre-stored facial information and fingerprint information of the user;

receive, via the web application from the user, an additional entry that relates to at least one rule for determining an amount of the gratuity, wherein the at least one rule includes at least one from among a merchant-specific rule that corresponds to a specific merchant and a location rule that corresponds to a geographical location data of the commercial transaction;

display, via the web application on the display screen, a user interface that includes a list of predetermined percentages;

wherein, when the additional entry includes the location rule, the processor is further configured to:
   obtain the geographical location data of the commercial transaction;
   automatically override the list of predetermined percentages and automatically determine a new amount of the gratuity based on the geographical location data;
   receive, from the user via the display screen, a touch input that corresponds to the new amount of gratuity in response to the geographical location data;
   receive, from the user via the communication interface, an authorization to proceed with the commercial transaction with the new amount of gratuity; and
   submit, to a payment provider via the communication interface, the calculated total amount that includes the new amount of gratuity and the received authorization to proceed, in order to execute the commercial transaction; and wherein, when the additional entry includes the merchant-specific rule, the processor is further configured to:
   set a predetermined gratuity amount for merchants belonging to a same class;
   receive information that a particular merchant among the merchants belonging to the same class is the user's favorite merchant;
   apply, in response to receiving the information of said particular merchant, the merchant-specific rule that changes the predetermined gratuity amount for merchants belonging to the same class to a new gratuity amount that is more than the predetermined gratuity amount for merchants belonging to the same class;
   receive, from the user via the display screen, a touch input that corresponds to the new gratuity amount in response to applying the merchant-specific rule;
   receive, from the user via the communication interface, an authorization to proceed with the commercial transaction with the new gratuity amount; and
   submit, to a payment provider via the communication interface, the calculated total amount that includes the new gratuity amount and the received authorization to proceed, in order to execute the commercial transaction.

9. The portable device of claim 8, wherein the at least one gratuity entry represents a numerical percentage.

10. The portable device of claim 8, wherein the at least one merchant entry includes a merchant type.

11. The portable device of claim 8, wherein the at least one merchant entry includes a merchant name.

12. The portable device of claim 8, wherein the at least one gratuity entry represents an amount of currency.

13. The portable device of claim 8, wherein the processor is further configured to perform the submitting by charging a credit card account associated with the user.

14. The portable device of claim 8, wherein the processor is further configured to receive the user input by displaying, on the display screen, a user interface that includes a blank space for entering textual information, and receiving, from the user, a textual input that corresponds to at least one from among the at least one gratuity entry and the at least one merchant entry.

* * * * *